T. L. WEBSTER.
Car Brake and Starter.

No. 222,218. Patented Dec. 2, 1879.

Witnesses:
E. E. Masson
Philip Mauro

Inventor
Theodore L. Webster
by A. Pollok
his attorney.

UNITED STATES PATENT OFFICE.

THEODORE L. WEBSTER, OF CHARLESTOWN, MASSACHUSETTS.

IMPROVEMENT IN CAR BRAKES AND STARTERS.

Specification forming part of Letters Patent No. 222,218, dated December 2, 1879; application filed October 9, 1879.

*To all whom it may concern:*

Be it known that I, THEODORE L. WEBSTER, of Charlestown district, in Boston, Massachusetts, have invented a new and useful Improvement in Brakes and Car-Starters, which improvement is fully set forth in the following specification.

In the class of apparatus to which this invention more particularly relates a brake and car-starter are so combined that when the brake is applied the starter is set, and on release of the brake acts to start the car.

The general operation of my present device is similar to that set forth in Letters Patent No. 167,370, August 31, 1875, upon which it is mainly intended as an improvement.

The invention consists in the special mechanism for working the brake and locking the same; also, in the location of the spring which operates the car-starter, and which may be of any suitable form, under the seat, or on the body of the car, the said spring being so combined with and arranged with respect to the ratchet-wheel and pawl of the starter that its retractile power serves to turn the ratchet-wheel to start the car through the pawl and the lever connected therewith; also, in the application of the starter to the common form of brake, and in the combination and arrangement of parts, as hereinafter more fully set forth.

The following is a description of what I deem the best mode of carrying my invention into effect, reference being had to the accompanying drawings, which form a part of this specification.

Figure 1:
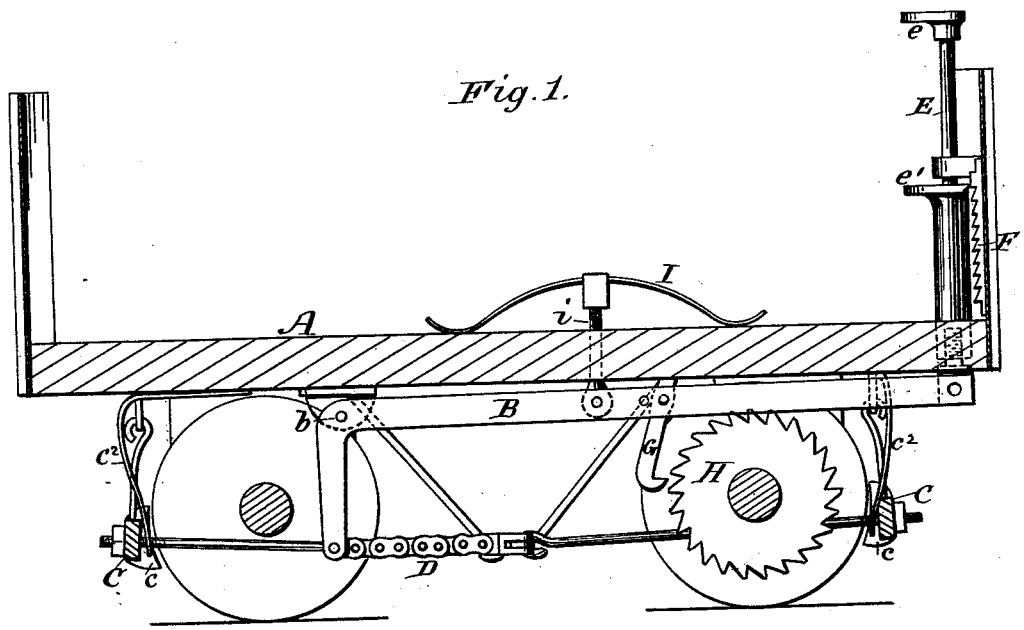
Figure 2:
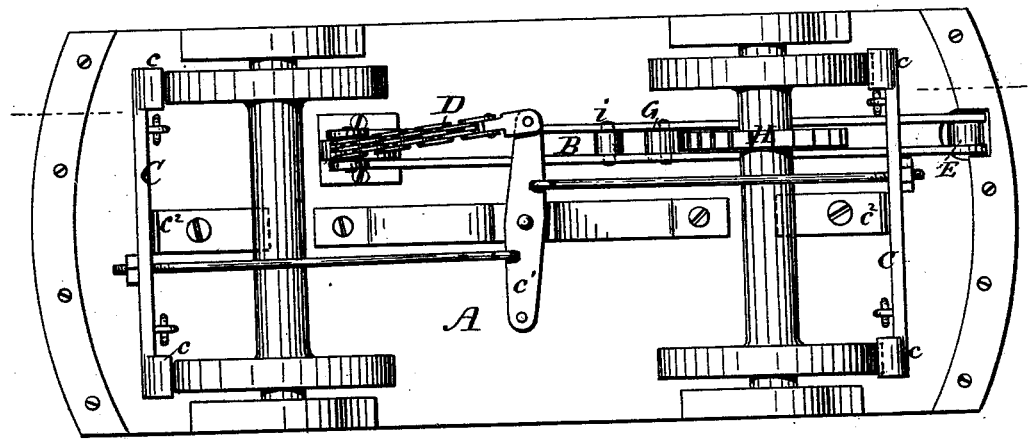

Figure 1 is a side view, partly in section, of so much of a car as is necessary to illustrate my invention, the wheels on one side being removed; and Fig. 2, a bottom view.

The same letters indicate like parts.

A is the body or bottom part of the car, to which the bent lever B is pivoted at $b$; C, the brake, connected with the short arm of the lever B by the jointed rod or chain D; E, a rod connected with the long arm of the lever B for working the brake; F, a rack for locking the same; G, a pawl pivoted on the lever B; H, a ratchet-wheel fixed on one of the car-axles, and I a spring connected with the long arm of the lever B and bearing against the body of the car.

The lever B is formed of two bars connected by cross-bars. It is arranged so that when the long arm is depressed by the rod E the two bars pass on opposite sides of the ratchet-wheel H. The brake C is of the form ordinarily used. The shoes $c$ are suspended from the car by jointed rods or chains, and are connected with the swiveled plate $c'$ on opposite sides of the center, so that by turning said plate the two sets of shoes are simultaneously applied or released. Springs $c^2$ withdraw the shoe when the brake is off. The connection of the brake with the lever B is such that the depression of its long arm puts on the brake.

The rod E is preferably round, and is connected with the end of the long arm of the lever B by a swivel-joint, which permits it to be turned on its axis. At its top is a handpiece, $e$, for operation. A locking-piece, $e'$, is attached to it at the part opposite the rack F. This locking-piece is preferably made broad at the top, in order that the foot of the driver may be placed thereon to depress the rod E, if desired. As shown in the drawings, the brake-rod E is placed at the front of the car, the rack F being fixed to the dash-board.

The pawl G is pivoted between the two bars of the lever B opposite the ratchet-wheel H. At the upper end it is beveled at an acute angle on the side toward the ratchet-wheel, so that when the long arm of the lever is elevated contact of the pawl with the under side of the car-body holds it out of contact and engagement with the ratchet-wheel.

The spring I is represented in the form of a leaf-spring, the ends of which bear against the bottom of the car, while its center is connected, by means of a rod, $i$, with the long arm of the lever by a hinge-joint. The strength of the spring may be varied by suitable means, such as lengthening or shortening the distance between it and the point of attachment to the lever B through a screw-coupling on the rod $i$. The spring I may, however, be a spiral or rubber spring, or of any suitable form. It is preferably placed under the seat.

The operation will readily be understood in connection with the foregoing description. The car is supposed to be moving forward, so that the teeth of the ratchet-wheel move upward on the side of the pawl. When it is wished to brake the car the rod E is depressed by foot or hand and partially rotated to lock it in position with one of the teeth of the rack F. The long arm of the lever B being at the same time pushed down, the spring I is compressed, the brake C is applied, and the pawl G depressed into contact with the ratchet-wheel H. Owing to the direction of the revolution of the latter, as long as it has any motion the pawl rides over the teeth thereof. When the car comes to rest the pawl sinks into the tooth of the ratchet-wheel opposite it. If now it is wished to start the car, the brake-rod E is unlocked, the spring I lifts the long lever-arm, and, through the engagement of the pawl G with one of the teeth of the ratchet-wheel H, partially turns the wheels of the car. At the same time the brake is released. When the pawl comes into contact at its upper end with the bottom of the car it is again held out of possibility of engagement with the ratchet-wheel.

By duplicating the lever, spring, ratchet-wheel, pawl, and brake-rod, the brake could be operated from either end of the car, and the car could be started in either direction. The same brake could be employed, the additional lever being connected with the opposite end of the swiveled arm c'.

It is evident that one or more parts of my invention could be used without the others. For example, other mechanism for working the brake could be used in connection with the application of the starter to brakes of ordinary construction.

Modifications may also be made in the details described above without departing from the spirit of my invention. Thus, in place of having a skeleton-lever working outside the ratchet-wheel, a solid lever working in a slot in the ratchet-wheel, or between two ratchet-wheels, could be employed.

Having thus fully described my said invention and the manner in which the same is or may be carried into effect, what I claim, and desire to secure by Letters Patent, is—

1. The combination, with a brake-operating lever, of a brake-rod connected therewith by swivel joint or pivot, substantially as described, a locking-piece attached to said rod, and a rack, the brake being applied and locked by depression and partial rotation of said rod, causing the engagement of the locking-piece with the rack-teeth, as set forth.

2. In combination with the ratchet-wheel and pawl of a car-starter, the spring located under the seat or on the body of the car, and connected with the pawl through the medium of a lever, the said spring, pawl, and ratchet-wheel being arranged as set forth, so that the retractile power of said spring turns the ratchet-wheel through the pawl and lever, substantially as described.

3. The combination, with a brake having two sets of brake-shoes connected with a swivel-plate, of a car-starter and a lever connected therewith and with said brake, and arranged to operate substantially as described, whereby the car-starter is set and both sets of brake-shoes applied by the same movement of said lever, and on the release of the brake the car-starter operates, as set forth.

4. A car starter and brake consisting of the following elements: first, a brake composed of two sets of brake-shoes connected with a swiveled plate; second, a bent lever pivoted to the car-body, one arm of which is connected with said plate; third, a brake-rod connected with said lever and adapted to be partially rotated; fourth, a locking-piece attached to said rod; fifth, a rack; sixth, a spring located under the seat or on the body of the car, and connected with the aforesaid lever; seventh, a pawl pivoted to the lever; and, eighth, a ratchet-wheel secured on the car-axle opposite the pawl, all substantially as specified.

In testimony whereof I have signed this specification in the presence of two subscribing witnesses.

THEODORE L. WEBSTER.

Witnesses:
ALEXR. CAMPBELL,
CHARLES T. BEEN.